United States Patent
Tamburro, Sr.

[11] Patent Number: 5,918,920
[45] Date of Patent: Jul. 6, 1999

[54] COMBINATION RAKE AND GATHERING TOOL

[76] Inventor: William C. Tamburro, Sr., 1066 Dunvegan Rd., West Chester, Pa. 19382-7167

[21] Appl. No.: 08/910,523

[22] Filed: Aug. 7, 1997

[51] Int. Cl.[6] .................................................. A01B 1/20
[52] U.S. Cl. .......................................... 294/51; 56/400.11
[58] Field of Search ............................ 294/49, 50.6, 50.7, 294/50.8, 50.9, 51, 52, 54.5, 55, 59; 7/114–116; 56/400.04–400.07, 400.11, 400.12; 172/375

[56] References Cited

U.S. PATENT DOCUMENTS

| | | | |
|---|---|---|---|
| 758,071 | 4/1904 | Hiles | 294/51 X |
| 1,504,913 | 8/1924 | Simoncelli | 294/52 |
| 1,578,532 | 3/1926 | Lagorio | 294/51 |
| 2,884,278 | 4/1959 | Waara | 294/51 |
| 3,105,348 | 10/1963 | Voshikian et al. | 56/400.12 |
| 3,987,609 | 10/1976 | Perry | 56/400.05 |
| 4,741,149 | 5/1998 | von Braucke et al. | 294/51 |
| 5,727,829 | 3/1998 | Bellichak | 294/51 |

FOREIGN PATENT DOCUMENTS

| | | | |
|---|---|---|---|
| 33336 | 6/1924 | Denmark | 56/400.05 |
| 471114 | 2/1929 | Germany | 294/51 |
| 41105 | 3/1925 | Norway | 56/400.05 |

*Primary Examiner*—Johnny D. Cherry

[57] ABSTRACT

A new combination rake and shovel tool for allowing leaves to be raked and scooped up with one implement. The inventive device includes an elongated handle and a combination rake and shovel portion secured to a lower end of the elongated handle.

4 Claims, 2 Drawing Sheets

COMBINATION RAKE AND GATHERING TOOL

BACKGROUND OF THE INVENTION

1. Field of the Invention

The present invention relates to multi-purpose tools and more particularly pertains to a new combination rake and shovel tool for allowing for leaves to be raked and scooped up with one implement.

2. Description of the Prior Art

The use of multi-purpose tools is known in the prior art. More specifically, multi-purpose tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art multi-purpose tools include U.S. Pat. No. 4,565,398 to Poulin; U.S. Pat. No. 4,741,149 to vom Braucke et al.; U.S. Pat. No. 5,425,226 to Kaufman; U.S. Pat. No. 5,297,306 to Shandel; U.S. Pat. No. 5,003,760 to Webb.

While these devices fulfill their respective, particular objectives and requirements, the aforementioned patents do not disclose a new combination rake and shovel tool. The inventive device includes an elongated handle and a combination rake and shovel portion secured to a lower end of the elongated handle.

In these respects, the combination rake and shovel tool according to the present invention substantially departs from the conventional concepts and designs of the prior art, and in so doing provides an apparatus primarily developed for the purpose of allowing for leaves to be raked and scooped up with one implement.

SUMMARY OF THE INVENTION

In view of the foregoing disadvantages inherent in the known types of multi-purpose tools now present in the prior art, the present invention provides a new combination rake and shovel tool construction wherein the same can be utilized for allowing for leaves to be raked and scooped up with one implement.

The general purpose of the present invention, which will be described subsequently in greater detail, is to provide a new combination rake and shovel tool apparatus and method which has many of the advantages of the multi-purpose tools mentioned heretofore and many novel features that result in a new combination rake and shovel tool which is not anticipated, rendered obvious, suggested, or even implied by any of the prior art multi-purpose tools, either alone or in any combination thereof.

To attain this, the present invention generally comprises an elongated wooden handle having a plastic grasping handle secured to an upper end thereof. A combination rake and shovel portion is secured to a lower end of the elongated wooden handle. The combination rake and shovel portion has a cylindrical collar receiving the lower end of the elongated wooden handle therein. A rivet extends through the collar and the wooden handle. The collar has a central member secured thereto. The central member is orthogonally disposed with respect to the wooden handle. The central member has an upper angular segment and a lower angular segment extending from opposing upper and lower edges thereof. The upper angular segment has a rake portion extending outwardly therefrom on a plane disposed above the wooden handle. The lower angular segment has a shovel portion extending outwardly therefrom on a plane disposed below the wooden handle. A space between the rake portion and the shovel portion forms a collection chamber.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new combination rake and shovel tool apparatus and method which has many of the advantages of the multi-purpose tools mentioned heretofore and many novel features that result in a new combination rake and shovel tool which is not anticipated, rendered obvious, suggested, or even implied by any of the prior art multi-purpose tools, either alone or in any combination thereof.

It is another object of the present invention to provide a new combination rake and shovel tool which may be easily and efficiently manufactured and marketed.

It is a further object of the present invention to provide a new combination rake and shovel tool which is of a durable and reliable construction.

An even further object of the present invention is to provide a new combination rake and shovel tool which is susceptible of a low cost of manufacture with regard to both materials and labor, and which accordingly is then susceptible of low prices of sale to the consuming public, thereby making such combination rake and shovel tool economically available to the buying public.

Still yet another object of the present invention is to provide a new combination rake and shovel tool which provides in the apparatuses and methods of the prior art some of the advantages thereof, while simultaneously overcoming some of the disadvantages normally associated therewith.

Still another object of the present invention is to provide a new combination rake and shovel tool for allowing for leaves to be raked and scooped up with one implement.

Yet another object of the present invention is to provide a new combination rake and shovel tool which includes an elongated handle and a combination rake and shovel portion secured to a lower end of the elongated handle.

Still yet another object of the present invention is to provide a new combination rake and shovel tool that allows a user to simply rotate the tool 180 degrees to change from a rake to a shovel.

Even still another object of the present invention is to provide a new combination rake and shovel tool that would simplify the task of raking leaves and collecting them for disposal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
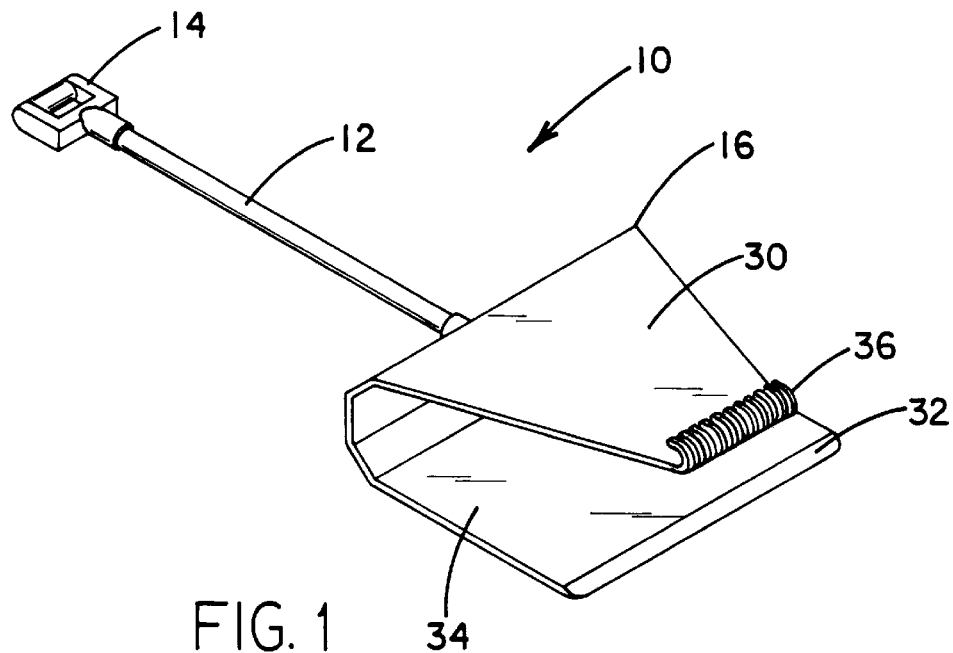
FIG. 1 is a perspective view of a new combination rake and shovel tool according to the present invention.
Figure 2:
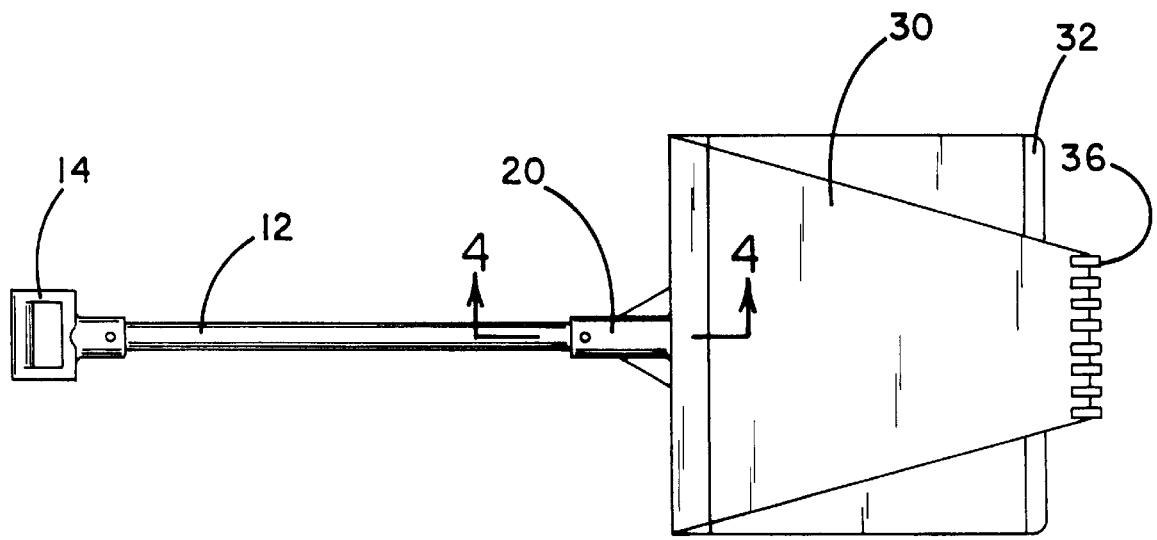
FIG. 2 is a top plan view of the present invention.
Figure 3:
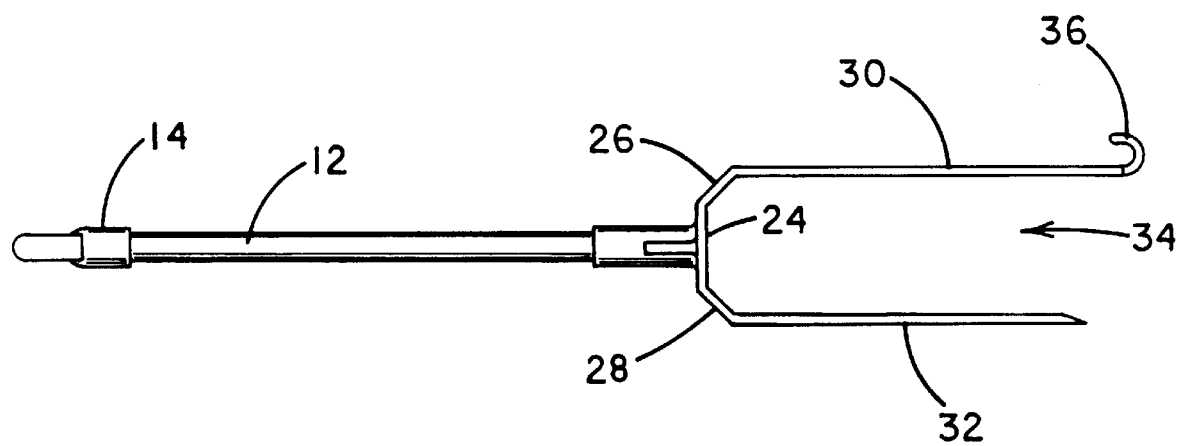
FIG. 3 is a side elevation view of the present invention.
Figure 4:
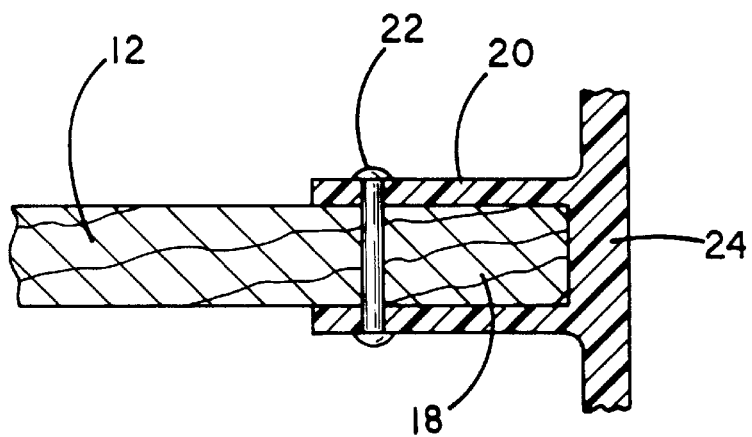
FIG. 4 is a cross-sectional view of the present invention as taken along line 4—4 of FIG. 2.

With reference now to the drawings, and in particular to FIGS. 1 through 4 thereof, a new combination rake and shovel tool embodying the principles and concepts of the present invention and generally designated by the reference numeral 10 will be described.

As best illustrated in FIGS. 1 through 4, the combination rake and shovel tool 10 comprises an elongated wooden handle 12 having a plastic grasping handle 14 secured to an upper end thereof.

A combination rake and shovel portion 16 is secured to a lower end 18 of the elongated wooden handle 12. The combination rake and shovel portion 16 has a cylindrical collar 20 receiving the lower end 18 of the elongated wooden handle 12 therein. A rivet 22 extends through the collar 20 and the wooden handle 12. The collar 20 has a central member 24 secured thereto. The central member 24 is orthogonally disposed with respect to the wooden handle 12. The central member 24 has an upper angular segment 26 and a lower angular segment 28 extending from opposing upper and lower edges thereof. The upper angular segment 26 has a rake portion 30 extending outwardly therefrom on a plane disposed above the wooden handle 12. The lower angular segment 28 has a shovel portion 32 extending outwardly therefrom on a plane disposed below the wooden handle 12. A space between the rake portion 30 and the shovel portion 32 forms a collection chamber 34.

In use, the present invention is a lawn care tool which would be used to rake leaves away from obstructions and push them into a pile for disposal. It would be quicker and easier to use than a conventional rake. The present invention would consist of a molded plastic rake portion 30 and shovel portion 32 with a collection chamber 34 attached to a wooden handle 12. The user would hold the device 10 with the rake tines 36 pointing downward and then turn it 180 degrees and scoop the leaves into the collection chamber 34. The leaves could then be dropped into a bag or into a larger pile. When not in use, the plastic grasping handle 14 allows the device 10 to hang on a wall area. The device 10 could also be used to rake and pick up other materials besides leaves, such as topsoil, gravel and other loose materials.

As to a further discussion of the manner of usage and operation of the present invention, the same should be apparent from the above description. Accordingly, no further discussion elating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A combination rake and gathering tool for allowing leaves to be raked and scooped up with one implement comprising, in combination:

an elongated wooden handle having a plastic grasping handle secured to an upper end thereof; and a combination rake and shovel portion secured to a lower end of the elongated wooden handle, the combination rake and shovel portion having a cylindrical collar receiving the lower end of the elongated wooden handle therein, a rivet extends through the collar and the wooden handle, the collar having a central member secured thereto, the central member being orthogonally disposed with respect to the wooden handle, the central member having an upper angular segment and a lower angular segment extending from opposing upper and lower edges thereof, the upper angular segment having a rake portion extending outwardly therefrom on a plane disposed above the wooden handle, the lower angular segment having a shovel portion extending outwardly therefrom on a plane disposed below the wooden handle, a space between the rake portion and the shovel portion forming a collection chamber.

2. A combination rake and gathering tool for allowing leaves to be raked and scooped up with one implement comprising, in combination:

an elongated handle; and a combination rake and shovel portion secured to a lower end of the elongated handle;

wherein the combination rake and shovel portion includes a central member secured to a lower end of the elongated handle, the central member is orthogonally disposed with respect to the elongated handle, the central member having an upper angular segment and a lower angular segment extending from opposing upper and lower edges thereof, the upper angular segment having a rake portion extending outwardly therefrom on a plane disposed above the handle, the lower angular segment having a shovel portion extending outwardly therefrom on a plane disposed below the handle.

3. The combination rake and gathering tool as set forth in claim 2 wherein the combination rake and shovel portion has a cylindrical collar receiving the lower end of the elongated handle therein, a rivet extends through the collar and the handle.

4. The combination rake and gathering tool as set forth in claim 2 wherein a collection chamber is defined by the combination rake and shovel portion.

\* \* \* \* \*